Feb. 3, 1959  F. C. BADALICH  2,871,760
MAGAZINE SLIDE CHANGER AND SHUTTER FOR STEREO PROJECTORS
Filed Nov. 4, 1954  4 Sheets-Sheet 4
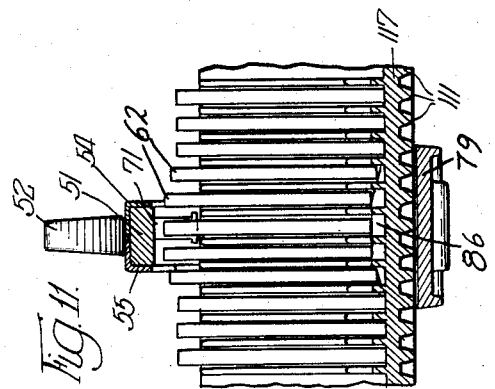
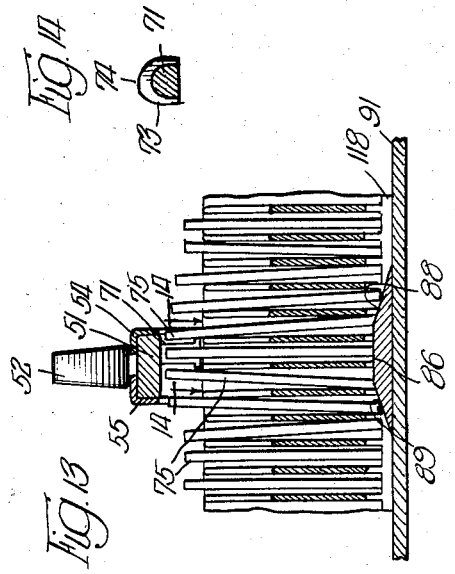
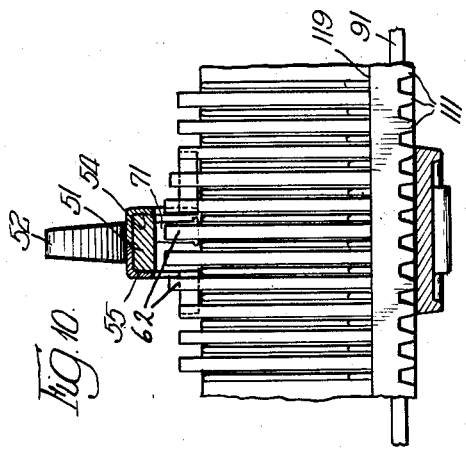
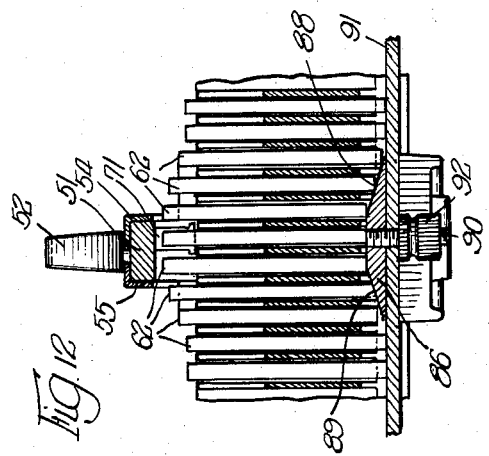
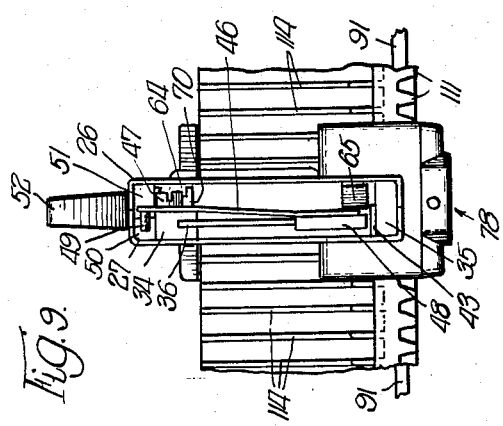
INVENTOR.
Frank C. Badalich,
BY
Robert R. Lockwood
Atty United States Patent Office 2,871,760
Patented Feb. 3, 1959

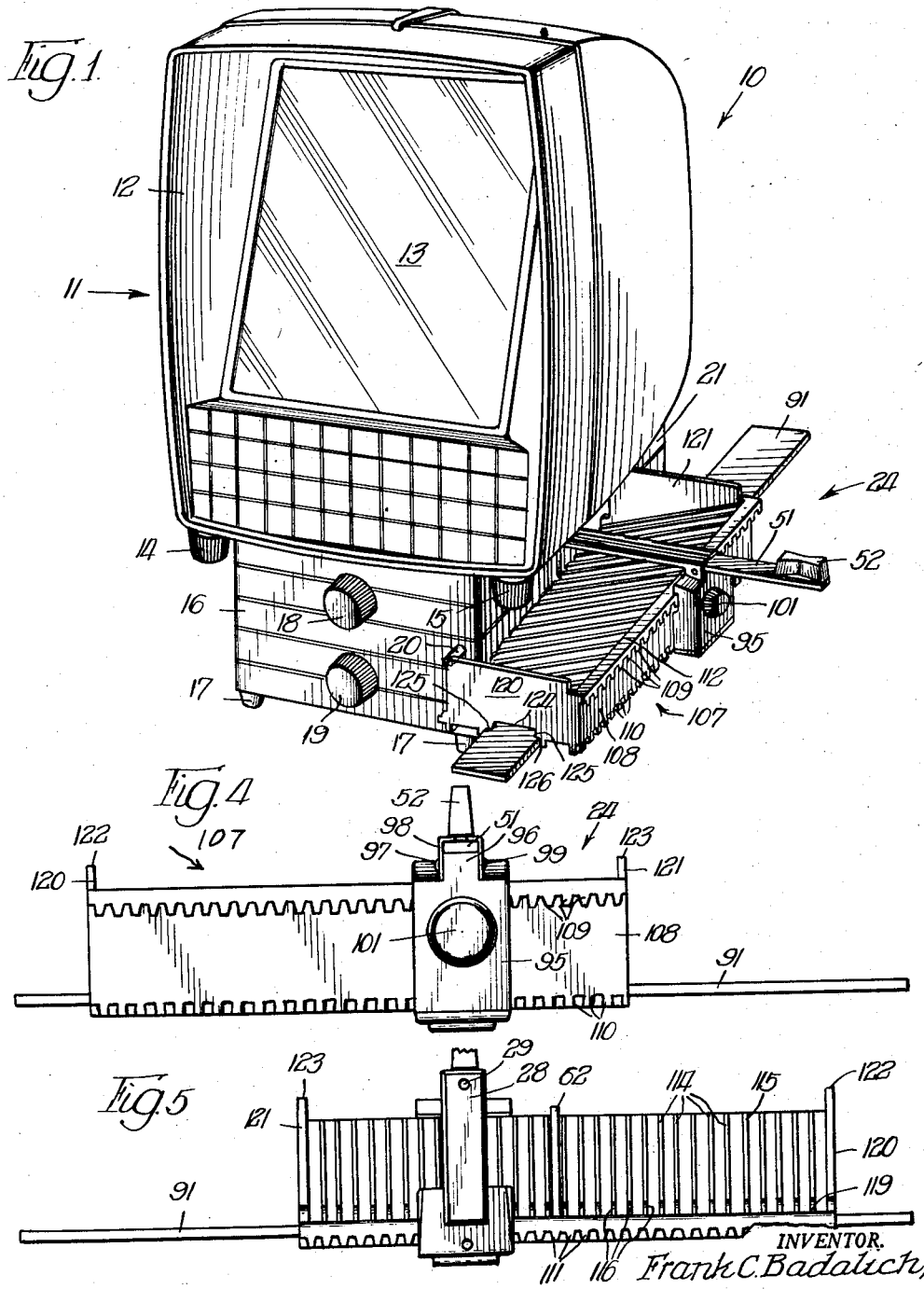

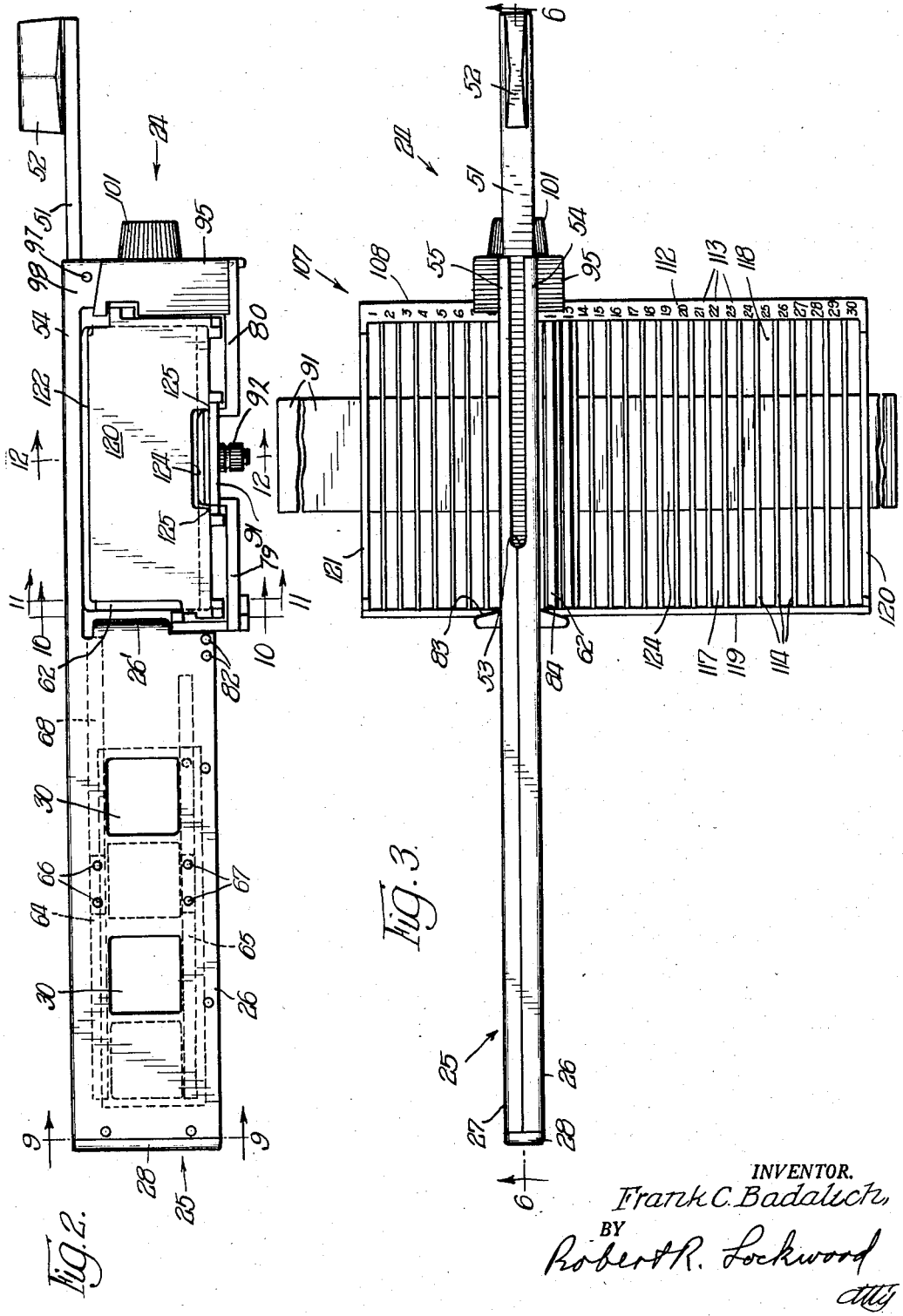

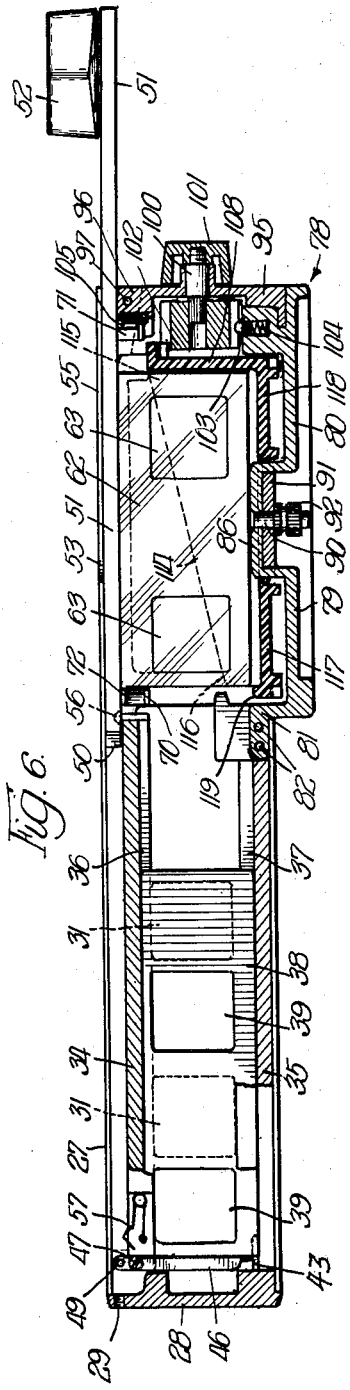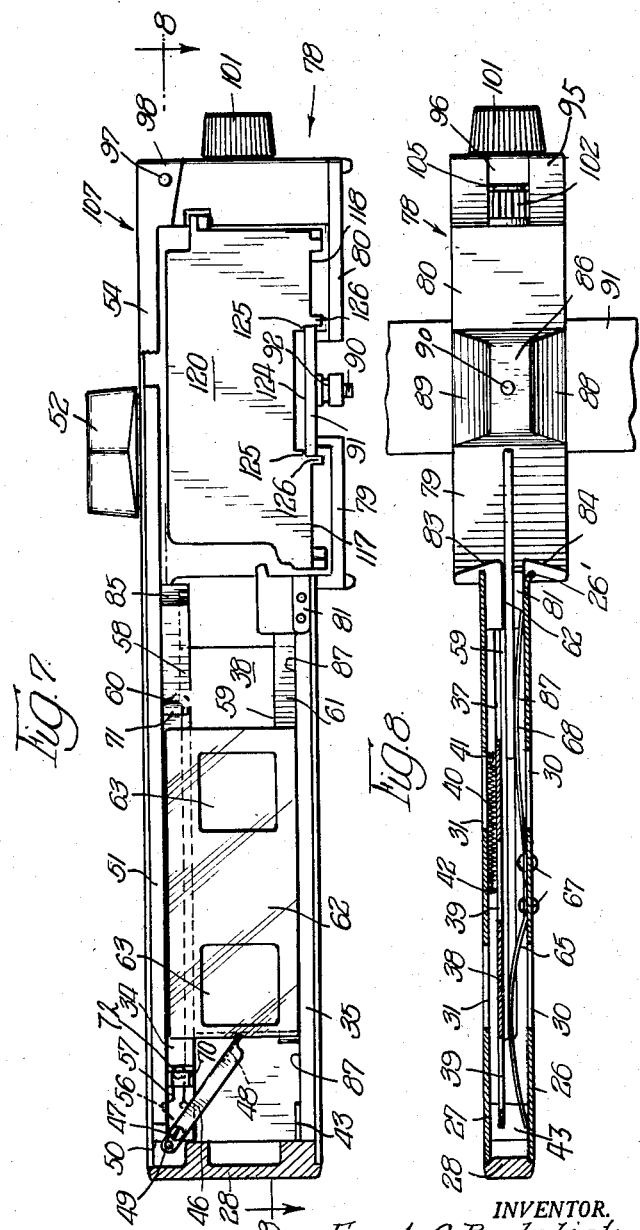

2,871,760

MAGAZINE SLIDE CHANGER AND SHUTTER FOR STEREO PROJECTORS

Frank C. Badalich, Chicago, Ill., assignor to Bell & Howell Company, Chicago, Ill., a corporation of Illinois Application November 4, 1954, Serial No. 466,908

4 Claims. (Cl. 88—28)

This invention relates, generally, to slide changers for stereopticon projectors and it has particular relation to such devices for moving stereo slides into and out of a stereo slide projector of the character shown in my co-pending application Serial No. 451,849, filed August 24, 1954, and now abandoned, and assigned to the assignee of this application.

Among the objects of this invention are: To provide for storing stereo slides in a tray, for moving the slides out of the tray into viewing position in a stereo projector, and out of viewing position back into the tray, and for moving the tray to position other slides therein where they can be shown by the projector; to hold a stereo slide in viewing position; to hold a stereo slide in predetermined upright position as soon as it leaves the tray; to operate a shutter to open position during the final movement of a stereo slide to the viewing position; to hold the stereo slide operating means in position corresponding to the viewing position of the stereo slide; to slidably mount the tray for movement parallel to the optical axes of the projector; to hold the stereo slides in the tray by a wall along one side and a lip along the other; to raise the stereo slide to be shown above the level of the lip in order to permit it to be moved transversely out of the tray and into viewing position in the projector; to separate stereo slides in the tray on opposite sides of a stereo slide being shown when the latter is returned to the tray in order to prevent interference with such operation; and to cushion the final movements of the stereo slide operating means at the ends of its strokes.

Other objects of this invention will, in part, be obvious and in part appear hereinafter.

This invention is disclosed in the embodiment thereof shown in the accompanying drawings and its comprises the features of construction, combination of elements and arrangement of parts that will be exemplified in the construction hereinafter set forth and the scope of the application of which will be indicated in the appended claims.

For a more complete understanding of the nature and scope of this invention reference can be had to the following description, taken together with the accompanying drawings, in which:

Figure 1 is a perspective view of a stereo slide projector, such as shown in the application above referred to, having applied thereto the stereo slide chamber in which the present invention is embodied;

Figure 2 is an elevational view of the slide changer shown in detached relation from the projector;

Figure 3 is a top plan view of the slide changer shown in Figure 2;

Figure 4 is a view in end elevation of the slide changer shown in Figure 3, the view being taken looking from right to left;

Figure 5 is a view in end elevation of the slide changer shown in Figure 3, the view being taken looking from left to right;

Figure 6 is a longitudinal vertical sectional view taken generally along the line 6—6 of Figure 3;

Figure 7 is a view that is somewhat similar to Figure 6, a slide being shown in viewing position and the tray holder and tray being shown in elevation;

Figure 8 is a horizontal sectional view taken generally along the line 8—8 of Figure 7, the tray being omitted;

Figure 9 is a vertical sectional view taken generally along the line 9—9 of Figure 2, the end cap being omitted;

Figure 10 is a vertical sectional view taken generally along the line 10—10 of Figure 2;

Figure 11 is a vertical sectional view taken generally along the line 11—11 of Figure 2, just inside the lip which prevents movement of the slides out of the open side of the tray;

Figure 12 is a vertical sectional view taken generally along the line 12—12 of Figure 2;

Figure 13 is a view similar to Figure 12 but showing paper backed stereo slides and how they are separated when a slide is being returned to the tray so as to avoid interference with this operation; and Figure 14 is a horizontal sectional view at an enlarged scale taken generally along the line 14—14 of Figure 13 to show the shape of the flange which functions to separate the slides as shown in Figure 13.

Referring now particularly to Figure 1 of the drawings, it will be observed that the reference character 10 designates, generally, a stereo projecting device such as disclosed in the co-pending application above referred to. As there pointed out the projector 10 is intended for mounting on a table and it can be used for viewing stereo slides on a screen carried thereby or for viewing them on a remotely positioned screen.

The stereo projector 10 includes a front frame, shown generally at 11, which comprises an upper portion 12 on which a viewing screen 13 is mounted. At the lower left hand side of the upper portion 12 there is a tilt control knob 14 and at the lower right hand corner there is a vertical adjustment knob 15. In the co-pending application above referred to the manner is disclosed in which the knobs 14 and 15 operate tilting mirrors to adjust the images on the screen 13 relative to each other and to the vertical positions thereof.

The front frame 11 includes an integral lower portion 16 provided with feet 17 which may be rubber bushings for mounting on a table top. Mounted on the lower portion 16 is a picture separation knob 18 and a focus adjustment knob 19. These knobs are employed, as described in the co-pending application, for shifting the interocular positions of the two projection lens systems and for jointly moving them in order to obtain the proper focus. A changeover knob 20 in the form of a shaft projecting through the front wall of the lower portion 16 is employed as described in the co-pending application for shifting the position of a conversion lens so as to adapt one of the optical systems for use in conjunction with single slide projection. Extending rearwardly from the lower portion 16 of the front frame 11 is a rectangular channel frame that is indicated at 21. It can be made up of plates and constitutes a portion of the frame construction for the stereo projector 10.

Extending transversely through the rectangular channel frame 21 is a stereo slide changer that is indicated, generally, at 24 in which the present invention is embodied. It is illustrated more clearly in Figures 2, 3 and 4 of the drawings to which reference now can be had.

The slide changer 24 includes a tubular frame, shown generally at 25, having a rectangular cross-section. The frame 25 is formed by complementary front and back frame members 26 and 27 and it is arranged to extend transversely of the rectangular channel frame 21 of the stereo projector 10. At the inner or left hand end of the frame 25, as viewed in Figures 2 and 3, there is an end cap 28 which is provided with a threaded aperture 29 for receiving a set screw, as described in the co-pending application above referred to, which extends through a wall of the channel frame 21 and functions to hold the slide changer 24 securely in operative position in the stereo projector 10. As shown in Figure 8 the front and back frame members 26 and 27 have apertures 30 and 31 provided therein which register with each other and are arranged to register with the two optical axes of the two optical systems employed in the stereo projector 10.

As shown more clearly in Figures 6 and 7 of the drawings upper and lower tracks 34 and 35 extend along the upper and lower portions of the tubular frame 25. The upper track 34 is secured only to the back frame member 27 while the lower track 35 extends between the front and back frame members 26 and 27 and is suitably secured thereto. As shown more clearly in Figure 9 of the drawings a downwardly opening groove 36 is formed in the upper track 34. That groove is opposite an upwardly opening groove 37, Figure 8, which is formed in the lower track 35. These grooves 36 and 37 are provided for guiding a shutter 38 that is provided with openings 39 spaced apart the same distance that the openings 30—30 and 31—31 are spaced apart. When the shutter 38 occupies the position shown in Figures 6 and 8 of the drawings, it effectively closes the apertures 30—30 and 31—31 while these apertures are uncovered, as shown in Figure 7, when the shutter 38 is moved to the position there shown.

The shutter 38 is normally biased to the closed position shown in Figure 8 by a coil tension spring 40. One end of the spring 40 is secured at 41 to the shutter 38 while the other end is secured at 42 to the back frame member 27 of the frame 25. Thus the spring 40 normally biases the shutter 38 to the left as viewed in Figure 8. In order to cushion the final movement of the shutter 38 to the closed position under the influence of the spring 40 shock absorbing means 43 in the form of a short length of rubber pressure sensitive tape is applied to the inner end of the lower track 35 as shown in Figure 7. During its final movement the lower left hand corner of the shutter 38 engages the shock absorbing means 43 and it is thereby arrested with a minimum of shock.

It is desirable to move the shutter 38 to the open position only after a stereo slide has been moved substantially to the viewing position so as to intercept the light rays that otherwise would flash the screen. For this purpose a lever 46 is employed. It is pivoted at 47 on the inner end of the upper track 34 intermediate its ends and its lower end is provided with a flange 48, Figure 9, which contacts the left hand end of the shutter 38 and acts to move the same to the right when the other end of the lever 46 is moved in the opposite direction. The upper end of the lever 46 is provided with a pin 49, Figure 9, that is arranged to be engaged by the inner end 50 of a pusher bar 51 which is slidable within the frame 25 on the upper side of the upper track 34. The pusher bar 51 is operated by a handle 52 which can be grasped between the forefinger and thumb. It projects through a slot 53, Figure 3, in extensions 54 and 55 from the front and back frame members 26 and 27 respectively. It will be observed that the lever 46 is pivoted at 47 fairly close to the pin 49. Preferably the ratio of the lengths of the lever arms of the lever 46 is of the order of 10:1 so that only a slight movement of the pin 49 is required during the final movement of the pusher bar 51 inwardly in order to effect the movement of the shutter 38 from the position shown in Figure 6 to the open position shown in Figure 7.

Since the spring 40 is under tension when the shutter 38 is held in the open position as shown in Figure 7, it is desirable to provide some means for preventing movement of the pusher bar 51 from the position there shown until sufficient manual force is applied to the handle 52. For this purpose a recess 56, Figure 6, is provided on the underside of the pusher bar 51 near the inner end and it is arranged to be engaged by a spring detent 57 that is carried by the inner end of the upper track 34. The cooperative relationship between the recess 56 and the spring detent 57 is illustrated in Figure 7. The action is such that the pusher bar 51 is held in the position here shown until sufficient force is applied to the handle 52 to depress the spring detent 57.

The grooves 36 and 37 in the upper and lower tracks 34 and 35 are formed in part by flanges 58 and 59, Figure 7, which provide surfaces 60 and 61, respectively, against which a stereo slide 62, Figure 8, can be urged by suitable biasing means to be described presently. The surfaces 60 and 61 fix the position of the slide 62 along the optical axes of the projector 10 so that succeeding slides remain in focus once the same has been set properly.

It will be understood that the stereo slide 62 is of conventional construction and that it supports object carrying transparencies 63, Figure 7, which are spaced apart in a suitable mount the same distance that the apertures 30—30 and 31—31 are spaced apart. The stereo slide 62 as shown in Figures 7 and 8 is relatively fixed and constitutes a more or less permanent type of slide mount. It will be pointed out hereinafter that slides also are mounted in paper backing in which case they are substantially thinner than the slide 62. However the construction of the slide changer 24 is such that it is capable of handling either the relatively thick type of stereo slide 62 or the relatively thin paper mounted type.

With a view to holding the stereo slide 62 securely against the surfaces 60 and 61 upper and lower leaf springs 64 and 65, Figure 2, are employed. These springs are secured by rivets 66 and 67, respectively, to the front frame member 26. Their ends are bowed inwardly as shown in Figure 8 for the lower leaf spring 65. It is pointed out that the upper leaf spring 64 has one end 68, Figure 2, longer than the other end and extending substantially to the outer end of the tubular frame 25. The reason for extending the end 68 of the upper leaf spring 64 just described is to grip the leading end of the slide 62 as it enters the outer end of the tubular frame 25 and to hold it in an upright position against the surface 60 formed on the upper track 34. Not only is the slide 62 accurately held in a vertical position by the extended end 68 of the upper leaf spring 64 as it is being moved toward the viewing position but also this portion of the spring serves to hold it in the upright position until it is ejected from the outer end of the tubular frame 25. This arrangement is of particular importance when the slide 62 is of the paper backed thin type. In this manner by passing of the slide by the slide operating means is avoided.

In order to move the slide 62 into and out of the viewing position on movement of the pusher bar 51 in corresponding directions it is provided with a depending inner pusher pin 70, Figures 6 and 7, and an outer depending pusher pin 71. These pusher pins 70 and 71 are arranged to engage the respective upper end portions of the slide 62, the inner pusher pin 70 engaging the upper left hand corner of the slide 62 as the pusher bar 51 is moved to the right to withdraw the slide 62 while the outer pusher pin 71 is arranged to engage the upper right hand corner of the slide 62 for pushing it into the viewing position on corresponding inward movement of the pusher bar 51. It will be observed that the inner pusher pin 70 has a slot 72 in the surface thereof shown in Figures 6 and 7. The purpose of this slot is to clear the upper leaf spring 64.

As shown in Figure 14 the lower end of the outer pusher pin 71 is provided with a flange 73 that has a rounded portion 74. The purpose of this rounded portion 74 is to separate stereo slides, such as paper bound stereo slides 75, Figure 13, which are positioned on opposite sides of a paper bound slide that is being returned from the tubular frame 25 to the storage tray, to be described hereinafter. As shown here, because of the relative thinness of this type of slide it is quite likely that these adjacent slides will tilt so as to interfere with the return of the outer pusher pin 71 therebetween unless the rounded portion 74 is provided thereon for separating the tilted slides 75 so as to facilitate entry of the pusher pin 71 therebetween.

At the outer end of the tubular frame 25 there is provided a tray holder that is shown, generally, at 78. As shown more clearly in Figures 6, 7 and 8 of the drawings the tray holder 78 includes floor portions 79 and 80. The floor portion 79 has an extension 81 which is secured by rivets 82 to the lower right hand corner of the front and back frame members 26 and 27. It will be observed in Figure 8 that the floor portion 79 also is provided with guides having inclined surfaces 83 and 84 which serve to move the slide 62 to the right and insure that it is in proper position in the storage tray to be described as the latter moves transversely across the tray holder 78. The entry of the slide 62 into the outer end of the tubular frame 25 is facilitated by a beveled outer end surface 85 of the upper track 34, Figure 7, and also by an outflared portion 26' at the outer end of the front frame member 26, Figure 8.

Centrally located between the floor portions 79 and 80 of the tray holder 78 is a raised portion 86 the surface of which is at the same level as the surface 87 on the lower track 35 along which the lower edge of the slide 62 moves to and from the viewing position. The central raised portion 86 is employed in order to elevate the slide 62 to be viewed to this position. For this purpose inclined surfaces 88 and 89 are provided on opposite sides of the central raised portion 86. Thus, as the slides 62 are moved from one side to the other of the tray holder 78, they are raised by one or the other of the inclined surfaces 88 or 89, as shown in Figures 10, 11 and 12, to position their lower edges at the level of the surface 87.

Depending from the central raised portion 86 is a stud 90 which projects through a guide bar 91 that extends transversely of the tray holder 78 as shown more clearly in Figures 1, 3 and 8 of the drawings. A nut 92 serves to detachably mount the guide bar 91 on the stud 90 between the floor portions 79 and 80. The guide bar 91 is employed for guiding a tray in which the slides 62 are stored as will be described presently.

At the right hand end of the tray holder 78 there is a pinion housing 95 which may be secured to the right hand end of the floor portion 80 by screws (not shown). The pinion housing 95 has a boss 96, Figure 4, formed integrally therewith which is positioned between ears 98 and 99 that depend from the extensions 54 and 55 of the front and back frame members 26 and 27. A rivet 97 extending through the boss 96 and ears 98 and 99 serves to hold these parts securely together. A shaft 100, Figure 6, is rotatably mounted in the vertical wall of the pinion housing 95 and it carries at its outer end a knob 101 which can be gripped between the thumb and forefinger of the operator to rotate a pinion 102 that is mounted non-rotatably on the other end of the shaft 100. A ball 103 urged toward the pinion 102 by a compression spring 104 serves to permit operation of the pinion 102 in a stepwise fashion for successively bringing slides 62 into register with the tubular frame 25 in a manner to be described in more detail presently. On the inner face of the boss 96 is shock absorbing means 105, similar to the shock absorbing means 43 and formed of like material for engagement by the rounded portion 74 of the flange 73 on the outer pusher pin 71 to cushion the outward movement of the pusher bar 51 when it is to be stopped.

As illustrated in the drawings the slides 62 or the paper bound stereo slides 75 are carried in and stored in a one-piece tray of molded plastic that is indicated, generally, at 107. As shown more clearly in Figures 1 and 4 of the drawings the tray 107 includes an outer side wall 108 which is provided with depending rack teeth 109 along its upper portion for engagement by the teeth of the pinion 102. Thus, as the knob 101 is rotated, the tray 107 is moved in a stepwise fashion transversely of the tray holder 78 and along the guide bar 91. The tray 107 is provided with additional rack teeth 110 along the under side of the wall 108 for cooperation with a suitably disposed pinion (not shown) if such operation is desired. In addition, as shown in Figure 5, another set of rack teeth 111 is provided along the inner side of the tray 107 for cooperation with a suitably positioned pinion (not shown) if such operation here is desired in lieu of employing the rack teeth 109 with which the pinion 102 cooperates.

As illustrated in Figure 3 the upper surface 112 of the outer side wall 108 is provided with numbers as indicated at 113 to indicate the number of the stereo slide that occupies the position there adjacent.

It will be observed in Figure 3 that septums 114 are provided for separating the stereo slides 62. The septums 114 are joined integrally at the right hand end with the wall 108 and that they extend transversely across the tray 107 to the inner side thereof. As shown more clearly in Figure 6 the septums 114 are relatively wide at 115 where they join the outer side wall 108 and that they are relatively narrow as indicated at 116 at the other end along the inner side of the tray 107. One reason for this configuration of the septums 114 is that limitations in performing the molding operation for the one piece tray 107 require that the width of the relatively thin septums 114 be decreased as indicated in order to maintain a satisfactory molded product.

As illustrated in Figures 6 and 7 the tray 107 includes longitudinally extending spaced apart floor sections 117 and 118 that are located on opposite sides of the central raised portion 86 and also on opposite sides of the guide bar 91.

Along the inner edge of the tray 107 and along the left-hand edge of the floor section 117 as viewed in Figure 6 there is a lip 119 which extends a slight distance above the surface of the floor section 117. The purpose of the lip 119 is to cooperate with the outer side wall 108 for the purpose of preventing endwise movement of the slides 62 which are positioned in the tray 107 between the septums 117. Although the lip 119 extends only a slight distance above the upper surface of the floor section 117, it is capable of preventing endwise movement of the slides 62 even though the tray 107 may be tilted well past a 45° position from the horizontal. Because of the presence of the lip 119 it is necessary to raise the slides 62 to a position above its upper edge before it is possible to transport them from the tray 107 to the viewing position in the tubular frame 25. It will be understood that the upper edge of the lip 119 is slightly below the flat surface of the central raised portion 86 so that when a slide 62 has been moved up either of the inclines 88 or 89 onto the central raised portion 86, the lower edge of that slide will be above the upper edge of the lip 119 and the slide 62 then can be transported to the viewing position.

End walls 120 and 121 are formed integrally with the tray 107. They extend between the ends of the outer side wall 108 and the ends of the lip 119 and are joined integrally to the ends of the floor sections 117 and 118. As shown in Figure 5 the upper edges 122 and 123 of the end walls 120 and 121 extend slightly above the upper edges of the stereo slide 62. The reason for this is to make certain that the cover (not shown) which telescopes with the tray 107 does not come in contact with the upper edges of the slides 62. Between the floor sections 117 and 118 there is provided a longitudinal slot 124 having shoulders 125 along the edges thereof. This is shown more clearly in Figure 1 and it will be understood that these shoulders 125 ride on the upper surface of the guide bar 91 along the edges thereof and constitute the only contact that the tray 107 has with the tray holder 78 aside from the engagement between the pinion 102 and the rack teeth 109. Depending ribs 126, Figure 7, from the floor sections 117 and 118 immediately below and offset from the shoulders 125 cooperate with the sides of the guide bar 91 to insure that the tray 107 moves in proper relationship to the tray holder 78 and to the tubular frame 25.

In operation the stereo slide changer 24, preferably without having the tray 107 assembled therewith, is applied to the stereo projector 10 by inserting the tubular frame 25 through the rectangular channel frame 21 in the manner described in more detail in the application above referred to. It is clamped in position by the set screw also referred to therein. Assuming that the stereo projector 10 has been energized and properly adjusted, the cover is removed from the tray 107 containing the stereo slides to be shown and it is placed on one or the other ends of the guide bar 91. Since the positions in the tray 107 are numbered, as illustrated in Figure 3, it is preferable to position the tray 107 on the end of the guide bar 91 which projects beyond the front of the stereo projector 10 and then to show the stereo slides in the sequence indicated. However, they can be shown in a reverse sequence if desired.

When the tubular frame 25 is inserted in the stereo projector 10, it takes up such a position that the registering apertures 30—30 and 31—31 are located across the optical axes. However, no light is permitted to get through these apertures since the shutter 38 is in the closed position.

The knob 101 is rotated to position the stereo slide, for example slide number 1, that is desired to view opposite the tubular frame 25. This is accomplished by the rotation of the knob 101 and the cooperation between the pinion 102 rotated therewith and the rack teeth 109. Next the operator grasps the handle 52 between his thumb and forefinger and moves the pusher bar 51 to the left as viewed in Figures 1 and 6 of the drawings. The outer pusher pin 71 depending from the under side of the pusher bar 51 engages the right hand upper edge portion of the slide 62 and moves it across the central raised portion 86 where it is high enough to clear the lip 119. As soon as the slide 62 enters the outer end of the tubular frame 25 it comes between the surface 60 of the flange 58 and the longer end 68 of the upper leaf spring 64 and is securely held in this vertical position while it continues its inward movement on continued inward movement of the pusher bar 51. Shortly thereafter it engages the lower leaf spring 25 which assists in this holding operation. After the slide 62 has been moved so as to extend beyond the inner set of registering apertures 30—31, the end 50 of the pusher bar 51 engages the pin 49 extending from the short end of the lever 46. The lower end of the flange 48 at the outer end of the long arm of the lever 46 engages the inner end of the shutter 38 and, as shown in Figure 7, when the pusher bar 51 is moved to its innermost position, the shutter 38 is moved to uncover the registering openings 30—30 and 31—31, thereby permitting the light rays to impinge upon the transparencies 63 carried by the slide 62 so that the objects thereon are projected in the usual manner. The pusher bar 51 is held in this position by the interaction between the recess 56 on its underside and the spring detent 57. It will be recalled that this retaining action is desirable since the spring 40 is held in the stressed condition as long as the shutter 38 is held in the open position.

When it is desired to withdraw the slide 62 and return it to the tray 107, the handle 52 is grasped between the thumb and forefinger by the operator and the pusher bar 51 is moved outwardly. The spring detent 57 disengages the recess 56 and the spring 40 returns the shutter 38 to the closed position before the inner pusher pin 70, which in the viewing position of the slide 62 is spaced from its inner edge as shown in Figure 7, engages the slide 62 to move it out of the viewing position. The continued outward movement of the pusher bar 51 causes the slide 62 to be moved outwardly between the surfaces 60 and 61 on the upper and lower tracks 34 and 35 and the upper and lower leaf springs 64 and 65. During the final outward movement of the slide 62 from the tubular frame 25, the slide 62 is held in the upright position by the longer end 68 of the upper leaf spring 64 in the manner above described. When the pusher bar 51 has been retracted fully, as shown in Figure 6, the slide 62 has been returned to the tray 107. Then the knob 101 is rotated to position the next slide where it can be engaged by the outer pusher pin 71 and the process above described is repeated.

As the tray 107 carrying slide 62 is moved along the guide bar 91, the slides are moved by the inclined surface 88 onto the upper surface of the central raised portion 86 as shown in Figures 10, 11 and 12 of the drawings. When the next slide to be viewed is moved so that it is in front of the outer pusher pin 71, its lower edge has been elevated, as shown in Figure 10, so that it clears the upper edge of the lip 119. As the tray 107 is moved, the slides are lowered by the inclined surface 89 until they again rest on the floor sections 117 and 118.

Since certain further changes can be made in the foregoing construction and different embodiments of the invention can be made without departing from the spirit and scope thereof, it is intended that all matters shown in the accompanying drawings and described hereinbefore shall be interpreted as illustrative and not in a limiting sense.

What is claimed as new is:

1. A slide changer for moving the object carrying transparencies of stereo slides into and out of registry respectively with the optical axes of a stereo projector comprising, in combination, an elongated tubular frame having a rectangular cross-section and registering apertures for positioning across the optical axes of the projector, upper and lower tracks carried by said frame above and below said apertures having respectively downwardly and upwardly opening grooves formed in part by downwardly and upwardly extending flanges having slide receiving outer surfaces, leaf spring means carried by said frame biasing a slide to be viewed against said slide receiving surfaces, a shutter slidably mounted in said grooves having openings spaced apart the same distance as said apertures in said frame, spring means biasing said shutter to closed position, a lever pivoted intermediate its ends at the inner end of said housing and at one end engaging said shutter, a pusher bar slidable on the upper side of said upper track and inside said frame for engaging at its inner end near the end of its inward stroke the other end of said lever to move said shutter to open position against the biasing action of said spring means, a tray holder at the outer end of and secured to said frame and having a central raised portion and inclined portions on opposite sides thereof, an elongated guide bar secured to the under side of said central portion and extending transversely of said tray holder, an elongated stereo slide carrying tray slidably mounted on said tray holder and having a central longitudinally extending slot on its under side guided on said guide bar, the lower edges of stereo slides carried by said tray being adapted to engage one or the other of said inclined portions and to be lifted thereby onto said central raised position as said tray is moved, means for moving said tray along said guide bar, septums extending transversely of said tray for separating stereo slides therein, a wall extending along the outer side of said tray and a lip extending along the inner side thereof for holding stereo slides therebetween, the level of the surface of said central raised portion being above the level of the upper edge of said lip whereby a slide on said central raised portion can be moved over said lip into and out of viewing position in said frame, and means carried by said pusher bar for engaging the opposite ends of a slide on said central raised portion to push the same out of or into viewing position in said frame on corresponding endwise movement of said pusher bar.

2. A slide changer for moving the object carrying transparencies of stereo slides into and out of registry respectively with the optical axes of a stereo projector comprising, in combination, complementary front and back frame members providing an elongated tubular frame having a rectangular cross-section and registering apertures for positioning across the optical axes of the projector, upper and lower tracks carried by said frame above and below said apertures having respectively downwardly and upwardly opening grooves formed in part by downwardly and upwardly extending flanges having slide receiving outer surfaces, upper and lower leaf springs carried by said frame opposite said upper and lower tracks for biasing a slide to be viewed against said slide receiving surfaces, a shutter slidably mounted in said grooves having openings spaced apart the same distance as said apertures in said frame, a coil tension spring interconnecting said frame and said shutter and biasing the latter to closed position, a lever pivoted intermediate its ends on the inner end of said upper track and at one end engaging said shutter, a pusher bar slidable on the upper side of said upper track and inside said frame for engaging at its inner end near the end of its inward stroke the other end of said lever to move said shutter to open position against the biasing action of said spring, a tray holder at the outer end of and secured to said frame and having a central raised portion and inclined portions on opposite sides thereof, an elongated guide bar secured to the under side of said central portion and extending transversely of said tray holder, an elongated stereo slide carrying tray slidably mounted on said tray holder and having a central longitudinally extending slot on its under side guided on said guide bar, the lower edges of stereo slides carried by said tray being adapted to engage one or the other of said inclined portions and to be lifted thereby onto said central raised portion as said tray is moved, rack means on said tray and cooperating pinion means on said tray holder for moving said tray along said guide bar, septums extending transversely of said tray for separating stereo slides therein, a wall extending along the outer side of said tray and a lip extending along the inner side thereof for holding stereo slides therebetween, the level of the surface of said central raised portion being above the level of the upper edge of said lip whereby a slide on said central raised portion can be moved over said lip into and out of viewing position in said frame, and inner and outer pusher pins depending from said pusher bar for engaging the opposite ends of a slide on said central raised portion to push the same out of or into viewing position in said frame on corresponding endwise movement of said pusher bar.

3. A slide changer for moving the object carrying transparencies of stereo slides into and out of registry respectively with the optical axes of a stereo projector comprising, in combination, complementary front and back frame members providing an elongated tubular frame having a rectangular cross-section and registering apertures for positioning across the optical axes of the projector, upper and lower tracks carried by said frame above and below said apertures having respectively downwardly and upwardly opening grooves formed in part by downwardly and upwardly extending flanges having slide receiving outer surfaces, upper and lower leaf springs carried by said frame opposite said upper and lower tracks for biasing a slide to be viewed against said slide receiving surfaces, said upper leaf spring extending substantially to the outer end of said housing and engageable with the upper portion of a slide on entry of its inner end into said housing and disengaging the same on departure thereof from said housing whereby said slide is held in predetermined position with respect to said housing, a shutter slidably mounted in said grooves having openings spaced apart the same distance as said apertures in said frame, a coil tension spring interconnecting said frame and said shutter and biasing the latter to closed position, a lever pivoted intermediate its ends on the inner end of said upper track and at one end engaging said shutter, a pusher bar slidable on the upper side of said upper track and inside said frame for engaging at its inner end near the end of its inward stroke the other end of said lever to move said shutter to open position against the biasing action of said spring, spring detent means cooperating with said pusher bar to hold it in its innermost position, a tray holder at the outer end of and secured to said frame and having a central raised portion and inclined portions on opposite sides thereof, an elongated guide bar secured to the under side of said central portion and extending transversely of said tray holder, an elongated stereo slide carrying tray slidably mounted on said tray holder and having a central longitudinally extending slot on its under side guided on said guide bar, the lower edges of stereo slides carried by said tray being adapted to engage one or the other of said inclined portions and to be lifted thereby onto said central raised portion as said tray is moved, rack means on said tray and cooperating pinion means on said tray holder for moving said tray along said guide bar, septums extending transversely of said tray for separating stereo slides therein, a wall extending along the outer side of said tray and a lip extending along the inner side thereof for holding stereo slides therebetween, the level of the surface of said central raised portion being above the level of the upper edge of said lip whereby a slide on said central raised portion can be moved over said lip into and out of viewing position in said frame, inner and outer pusher pins depending from said pusher bar for engaging the opposite ends of a slide on said central raised portion to push the same out of or into viewing position in said frame on corresponding endwise movement of said pusher bar, the outer surface of said outer pusher pin being shaped to separate slides in said tray on opposite sides of a slide being shown when said pusher bar is operated to return the same to its position in said tray.

4. A slide changer for moving the object carrying transparencies of stereo slides into and out of registry respectively with the optical axes of a stereo projector comprising, in combination, complementary front and back frame members providing an elongated tubular frame having a rectangular cross-section and registering apertures for positioning across the optical axes of the projector, upper and lower tracks carried by said frame above and below said apertures having respectively downwardly and upwardly opening grooves formed in part by downwardly and upwardly extending flanges having slide receiving outer surfaces, upper and lower leaf springs carried by said frame opposite said upper and lower tracks for biasing a slide to be viewed against said slide receiving surfaces, said upper leaf spring extending substantially to the outer end of said housing and engageable with the upper portion of a slide on entry of its inner end into said housing and disengaging the same on departure thereof from said housing whereby said slide is held in predetermined position with respect to said housing, a shutter slidably mounted in said grooves having openings spaced apart the same distance as said apertures in said frame, a coil tension spring interconnecting said frame and said shutter and biasing the latter to closed position, shock absorbing means on the inner end of said lower track engageable by said shutter when returned by said spring to cushion the same, a lever pivoted intermediate its ends on the inner end of said upper track and at one end engaging said shutter, a pusher bar slidable on the upper side of said upper track and inside said frame for engaging at its inner end near the end of its inward stroke the other end of said lever to move said shutter to open position against the biasing action of said spring, spring detent means cooperating with said pusher bar to hold it in its innermost position, a tray holder at the outer end of and secured to said frame and having a central raised portion and inclined portions on opposite sides thereof, an elongated guide bar secured to the under side of said central portion and extending transversely of said tray holder, an elongated stereo slide carrying tray slidably mounted on said tray holder and having a central longitudinally extending slot on its under side guided on said guide bar, the lower edges of stereo slides carried by said tray being adapted to engage one or the other of said inclined portions and to be lifted thereby onto said central raised portion as said tray is moved, rack means on said tray and cooperating pinion means on said tray holder for moving said tray along said guide bar, septums extending transversely of said tray for separating stereo slides therein, a wall extending along the outer side of said tray and a lip extending along the inner side thereof for holding stereo slides therebetween, the level of the surface of said central raised portion being above the level of the upper edge of said lip whereby a slide on said central raised portion can be moved over said lip into and out of viewing position in said frame, inner and outer pusher pins depending from said pusher bar for enaging the opposite ends of a slide on said central raised portion to push the same out of or into viewing position in said frame on corresponding endwise movement of said pusher bar, the outer surface of said outer pusher pin being shaped to separate slides in said tray on opposite sides of a slide being shown when said pusher bar is operated to return the same to its position in said tray, and shock absorbing means on said tray holder engageable by said pusher bar on retraction thereof to cushion the same.

References Cited in the file of this patent

UNITED STATES PATENTS

| | | |
|---|---|---|
| 775,963 | Bentzon | Nov. 29, 1904 |
| 786,883 | Edmonds | Apr. 11, 1905 |
| 946,501 | Force | Jan. 11, 1910 |
| 1,849,145 | Illig et al. | Mar. 15, 1932 |
| 2,427,164 | Stechbart | Sept. 9, 1947 |
| 2,431,535 | Bergstrom | Nov. 25, 1947 |
| 2,487,862 | Gardner | Nov. 15, 1949 |
| 2,590,492 | Bennett et al. | Mar. 25, 1952 |
| 2,711,602 | Wiklund | June 28, 1955 |
| 2,756,630 | Goldberg | July 31, 1956 |

FOREIGN PATENTS

| | | |
|---|---|---|
| 96,670 | Sweden | Aug. 29, 1939 |